(No Model.)

F. P. HERVEY.
COOKING UTENSIL.

No. 355,527. Patented Jan. 4, 1887.

WITNESSES:
Donn Twitchell
C. Sedgwick

INVENTOR:
F. P. Hervey
BY
ATTORNEYS.

UNITED STATES PATENT OFFICE.

FRANCES PICKETT HERVEY, OF BRENHAM, TEXAS.

COOKING UTENSIL.

SPECIFICATION forming part of Letters Patent No. 355,527, dated January 4, 1887.

Application filed December 26, 1885. Serial No. 186,751. (No model.)

*To all whom it may concern:*

Be it known that I, FRANCES PICKETT HERVEY, of Brenham, in the county of Washington and State of Texas, have invented certain new and useful Improvements in Cooking Utensils, of which the following is a full, clear, and exact description.

This invention consists in the construction and arrangement of parts, as will be hereinafter fully described and claimed.

Reference is to be had to the accompanying drawings, forming part of this specification, in which similar letters of reference indicate corresponding parts in both the figures.

Figure 1:
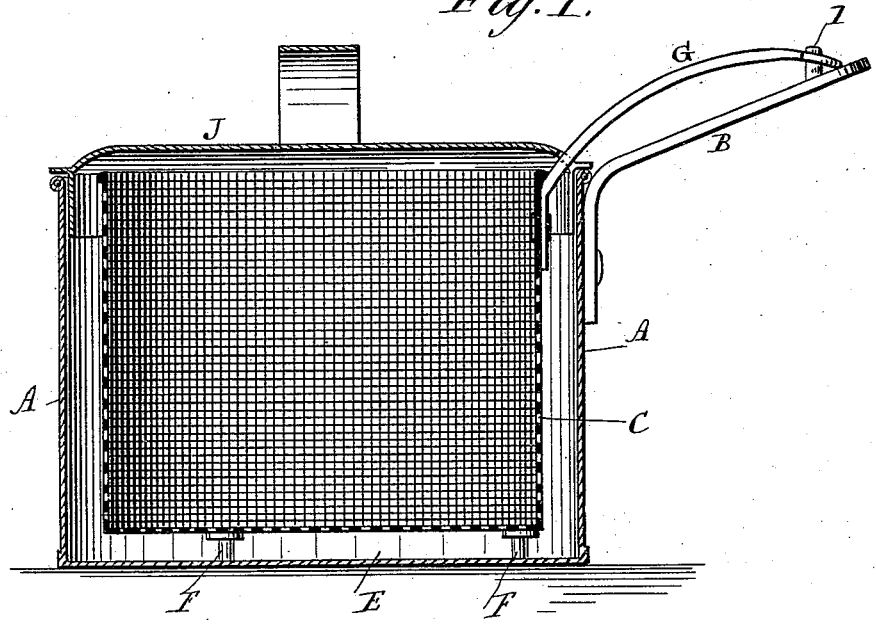
Figure 2:
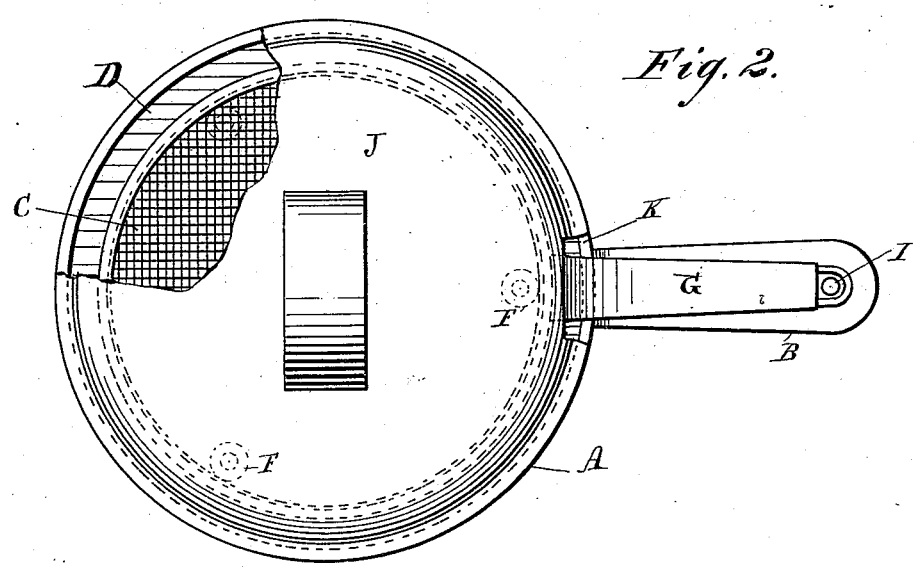

Figure 1 represents a vertical central section through the two vessels, with their handles in elevation. Fig. 2 is a plan or top view of the outer vessel with part of the cover broken away to show the inner perforated vessel and the water-space around it.

A in the accompanying drawings represents an ordinary vessel, of any suitable material, intended to contain water, provided with a handle, B, secured thereto in any convenient manner. To the interior of this water-vessel is fitted a gauze or perforated inner vessel, C, in which the food to be cooked is placed. This inner vessel, C, is somewhat smaller than the outer vessel, A, so that a water-space, D, between them is formed in order that the article being cooked shall be surrounded by water, and shall not come in contact with the outer vessel, to be injured or burned thereby.

It will be understood that by the expression "a water-space" I mean a space for water only, in contradistinction to the space within the perforated vessel for the water and the article being cooked.

The space E between the bottoms of the two vessels is formed by securing legs F to the bottom of the perforated vessel C, as shown. In order to maintain the interior vessel, C, centrally in the exterior vessel, A, so that the two vessels may not come in contact on their sides, to injure the food by scorching or burning, the end of the handle G is perforated, through which perforation projects a steady-pin, I, from the handle B, which, together with a notch, K, in the lid J, maintains the vessel C in position and preserves the water-space around it, as represented.

When the two vessels are together, as shown in the drawings, the handle G of the inner vessel, C, is directly above the handle B of the outer vessel, so that both may be removed together, and to conveniently remove the inner from the outer vessel its handle G is bent upward, forming a space sufficient so as to pass the fingers between the two handles, as shown in Fig. 1. By this construction and arrangement of the two vessels—the one to receive the food and the other to contain water—articles being cooked are prevented from burning by coming in contact with the outer vessel by preserving the water-space E, and the inner vessel quickly removed, leaving the water in the outer vessel and the food to be neatly served. By the notch K in the lid J and the pivoted handle G the food-vessel is maintained centrally in the water-vessel without attention, as represented.

It will be observed that by curving the handle G so that its outer pivoted end rests upon the surface of the handle B both vessels may be readily removed together, the same as if they were but one vessel.

I am aware that a perforated vessel has been placed within an outer vessel, the inner vessel having a swinging bail folding within the outer vessel, a separate hook being provided for lifting the bail. Below the perforated vessel was placed a removable frame for holding it above the water. When the frame was not used, the perforated vessel would be directly on the bottom of the outer vessel, and there would be no water-space between the bottoms of the two vessels, so that the articles being cooked would be liable to be burned. In my construction the handle of the perforated vessel is rigidly secured thereto, and extends beyond the two vessels at an inclination, so that the perforated vessel may be removed and its contents poured out or emptied without danger of scalding the hands by the escaping steam. The feet F will hold the perforated vessel sufficiently above the bottom of the outer vessel to prevent burning.

Having thus described my invention, what I claim as new, and desire to secure by Letters Patent, is—

A cooking-vessel consisting of the outer vessel, A, having a notched lid, and a handle, B, provided with the pin I, and the inner perforated vessel, C, having a handle projecting over the handle B, and apertured to receive the pin I, and legs F on the bottom of the perforated vessel, substantially as set forth.

FRANCES PICKETT HERVEY.

Witnesses:
R. E. PENNINGTON,
G. M. WILLIAMS.